United States Patent
Ito

(12) 
(10) Patent No.: US 6,382,245 B1
(45) Date of Patent: May 7, 2002

(54) RESINOUS RESERVOIR TANK

(75) Inventor: Akihiro Ito, Toyokawa (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/709,330

(22) Filed: Nov. 13, 2000

(30) Foreign Application Priority Data

Nov. 11, 1999 (JP) ............................................ 11-321085

(51) Int. Cl.$^7$ ............................ B62D 5/07; B01D 35/02
(52) U.S. Cl. .......................... 137/550; 137/576; 60/454
(58) Field of Search ................................ 137/550, 574, 137/576; 60/454, 585

(56) References Cited

U.S. PATENT DOCUMENTS

| | | | | |
|---|---|---|---|---|
| 3,989,056 A | * | 11/1976 | Reinartz ................. | 137/576 X |
| 4,424,829 A | * | 1/1984 | Millington et al. ...... | 137/576 X |
| 4,431,027 A | * | 2/1984 | Sabina, Jr. .............. | 137/576 X |
| 4,454,717 A | * | 6/1984 | Wade et al. ............. | 137/576 X |
| 4,964,983 A | * | 10/1990 | Abe et al. ............... | 210/168 |
| 5,356,535 A | * | 10/1994 | Ueno et al. ............. | 137/574 X |
| 5,493,863 A | * | 2/1996 | Yanagi et al. ........... | 60/583 |
| 5,513,490 A | * | 5/1996 | Howell et al. ........... | 60/327 |
| 5,819,795 A | * | 10/1998 | Guenther et al. ........ | 137/574 |
| 5,918,760 A | * | 7/1999 | Frodin et al. ........... | 137/574 X |
| 6,220,283 B1 | * | 4/2001 | Saarinen et al. ......... | 137/550 |
| 6,283,545 B1 | * | 9/2001 | Moy et al. ............... | 137/574 |
| 6,311,724 B1 | * | 11/2001 | Tracey et al. ............ | 137/550 |

FOREIGN PATENT DOCUMENTS

| | | |
|---|---|---|
| JP | 3-217371 | 9/1991 |
| JP | 9-118243 | 5/1997 |
| JP | 9-123931 | 5/1997 |
| JP | 9-123932 | 5/1997 |
| JP | 10-157760 | 6/1998 |

* cited by examiner

Primary Examiner—John Rivell
(74) Attorney, Agent, or Firm—Oblon, Spivak, McClelland, Maier & Neustadt, P.C.

(57) ABSTRACT

A generally ring-shaped intermediate member having a bracket-mounting portion is interposed between an upper tank having an inflow pipe and a lower tank having an outflow pipe. A resinous reservoir tank according to the invention is formed by connecting and integrating the upper tank, the intermediate member and the lower tank. When connecting the upper tank, the intermediate member and the lower tank, their relative angles in the rotational direction are set appropriately. Thus, the inflow pipe and the outflow pipe can be oriented in desired directions with respect to the intermediate member, which is fixed in position by the bracket.

4 Claims, 6 Drawing Sheets

RESINOUS RESERVOIR TANK

INCORPORATION BY REFERENCE

The disclosure of Japanese Patent Application No. HEI 11-321085 filed on Nov. 11, 1999 including the specification, drawings and abstract is incorporated herein by reference in its entirety.

BACKGROUND OF THE INVENTION

1. Field of the Invention

The invention relates to a resinous reservoir tank that is employed in a system such as a hydraulic power steering system and designed to store and filter working fluid.

2. Description of the Related Art

U.S. Pat. No. 2,944,487 discloses a resinous reservoir tank according to the related art. This reservoir tank is designed to store and filter working fluid in a hydraulic power steering system.

More specifically, the reservoir tank is composed of a cylindrical resinous upper tank (cover), a bottom-closed cylindrical resinous lower tank (reservoir) and a strainer. An inflow pipe (return pipe) and a current plate are integrated with the upper tank. An outflow pipe (bush) and a bracket are secured to the lower tank by means of insert molding. The strainer is mounted to a step portion of the lower tank. The upper tank and the lower tank are connected to each other by means of vibration welding.

Using the bracket, the reservoir tank is securely laid on an oil pump of the hydraulic power steering system. The working fluid that has flown into the upper tank from the inflow pipe is filtered by the strainer and then flows out towards the oil pump.

In such a resinous reservoir tank according to the related art, the lower tank is fixed in position by the bracket. The upper tank having the inflow pipe may be connected to the lower tank with the inflow pipe oriented in a desired direction. Therefore it becomes possible to freely set the direction of the inflow pipe in accordance with the condition of a relevant motor vehicle.

In the resinous reservoir tank according to the related art as described above, the inflow pipe disposed in the upper tank can freely be oriented with respect to the lower tank that is fixed in position by the bracket.

As is the case with this related art, if the reservoir tank is laid on the oil pump, the outflow pipe may be hung from the lower tank and directly connected to the intake side of the oil pump.

However, if the reservoir tank and the oil pump are separately installed, they are connected to each other by a pipe line. The outflow pipe is required to be oriented, for example, in accordance with the positional relation between the reservoir tank and the oil pump.

In such a case, it is considered to use an elbow-type outflow pipe, orient it in a predetermined direction and integrate it with the lower tank by means of insert molding. However, this requires a die corresponding to the direction of the outflow pipe and therefore increases the cost.

Alternatively, it is possible to prepare an elbow-type outflow pipe as a resinous compact separate from the lower tank and connect the outflow pipe to the lower tank by means of welding. However, the outflow pipe and the lower tank can be welded to each other merely over a length equal to the outer circumference of the outflow pipe. Therefore it is impossible to sufficiently guarantee bonding strength and sealability between both the components.

If working fluid is at a low temperature for example during the winter season, it demonstrates high viscosity and is therefore unlikely to penetrate the strainer. If the oil pump is operated in this state, the oil pump connected to the outflow pipe cannot suck a sufficient amount of working fluid. As a result, harmful noise may be generated in the oil pump.

SUMMARY OF THE INVENTION

The invention has been made to solve the aforementioned problems. According to a first aspect of the invention, there is provided a resinous reservoir tank comprising a resinous upper tank having an inflow pipe and a resinous lower tank having an outflow pipe, wherein a generally ring-shaped resinous intermediate member having a bracket-mounting portion is interposed between the upper tank and the lower tank, wherein the upper tank and the intermediate member are connected to and integrated with each other, and wherein the intermediate member and the lower tank are connected to and integrated with each other.

In this construction, the upper tank having the inflow pipe and the lower tank having the outflow pipe are separated from the intermediate member to which the bracket is attached. Therefore, when connecting the upper tank to the intermediate member and the intermediate member to the lower tank, if their relative angles in the rotational direction are set appropriately, it becomes possible to orient the inflow pipe and the outflow pipe in desired directions with respect to the intermediate member that is fixed in position by the bracket. Consequently, a widely applicable reservoir tank can be provided at a low cost.

In the aforementioned aspect of the invention, the upper tank and the intermediate member may be connected to each other by means of welding, and the intermediate member and the lower tank may be connected to each other by means of welding.

In this construction, the upper tank, the intermediate member and the lower tank are secured to one another by means of welding. Therefore, in addition to the aforementioned effect, the upper tank and the lower tank can easily be set to desired angles with respect to the intermediate member.

In the aforementioned aspect of the invention, the intermediate member may be composed of a generally ring-shaped ring portion and a bracket-mounting portion disposed in part of the ring portion, and a strainer may be disposed along the inner circumference of the ring portion.

In this construction, since the strainer is disposed along the inner circumference of the generally ring-shaped intermediate member, it becomes possible to employ, for example, a method of forming the strainer by means of insert molding. Therefore, in addition to the aforementioned effects, the strainer can be installed in the reservoir tank without resorting to an additional process of mounting the strainer.

In the aforementioned aspect of the invention, the lower tank may generally be formed into the shape of a funnel and a largest-diameter section of the generally funnel-shaped lower tank may be made approximately equal in diameter to the strainer, so that the lower tank and the strainer define a funnel chamber, and the outflow pipe may be connected to a smallest-diameter section of the generally funnel-shaped lower tank by means of integral molding.

In this construction, the funnel chamber is defined by the lower tank and the strainer. Thus, if the outflow pipe is connected to the intake side of the oil pump, the negative pressure resulting from a suction force of the oil pump functions over the entire region of the strainer and under the strainer. Therefore, in addition to the aforementioned effects, even working fluid that demonstrates high viscosity because of a low temperature (e.g. power steering oil) can penetrate the strainer easily. Moreover, since a sufficient amount of working fluid is sucked into the oil pump, generation of harmful noise is prevented.

DETAILED DESCRIPTION OF PREFERRED EMBODIMENTS

Hereinafter, a resinous reservoir tank (hereinafter referred to as the reservoir tank) according to a first embodiment of the invention will be described in detail with reference to FIGS. 1 through 7. This reservoir tank is used, for example, to store and filter working fluid in a hydraulic power steering system for motor vehicles.

Figure 1:
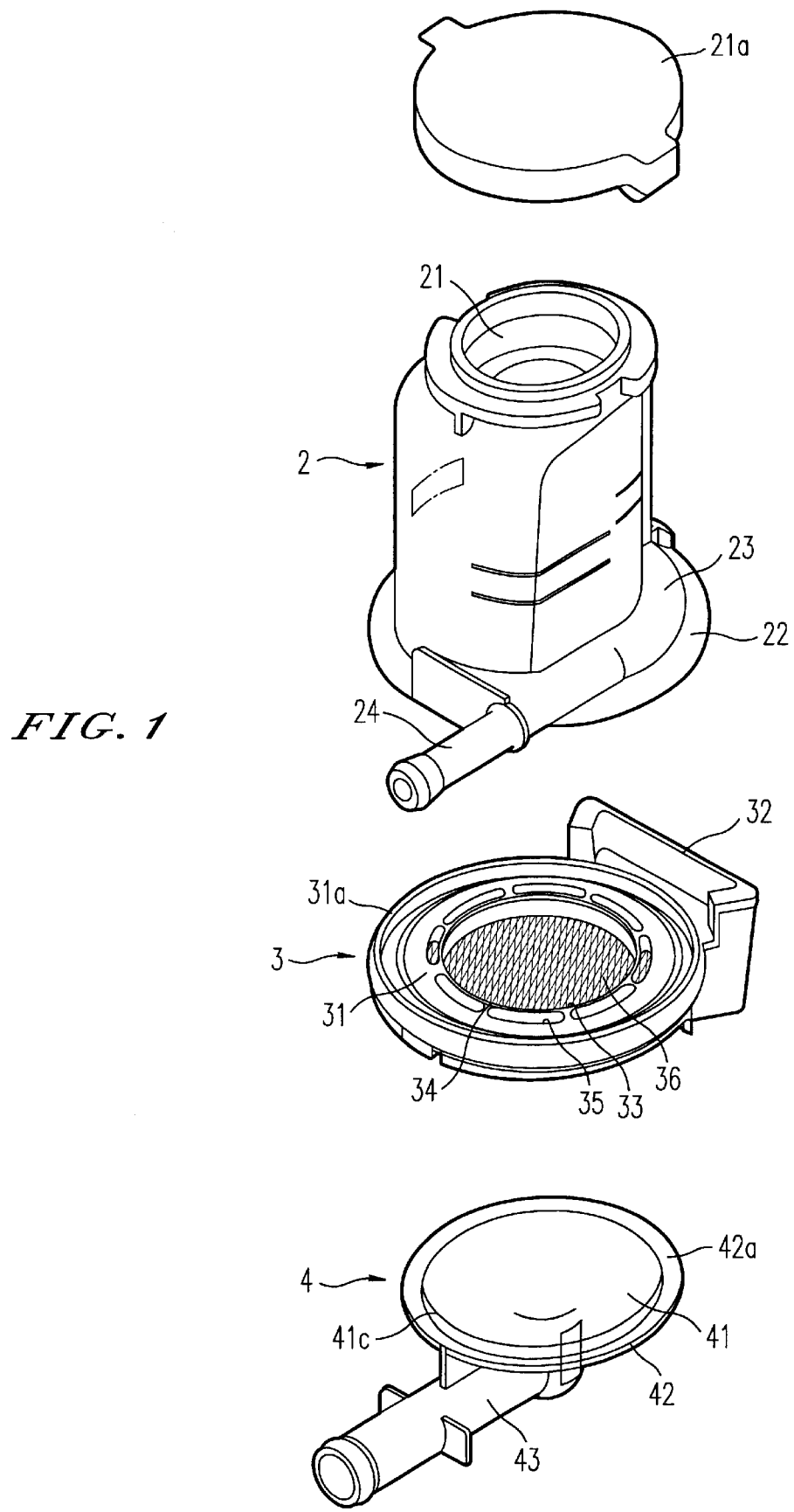
FIG. 1 is an exploded perspective view of a resinous reservoir tank according to a first embodiment of the invention.
Figure 2:
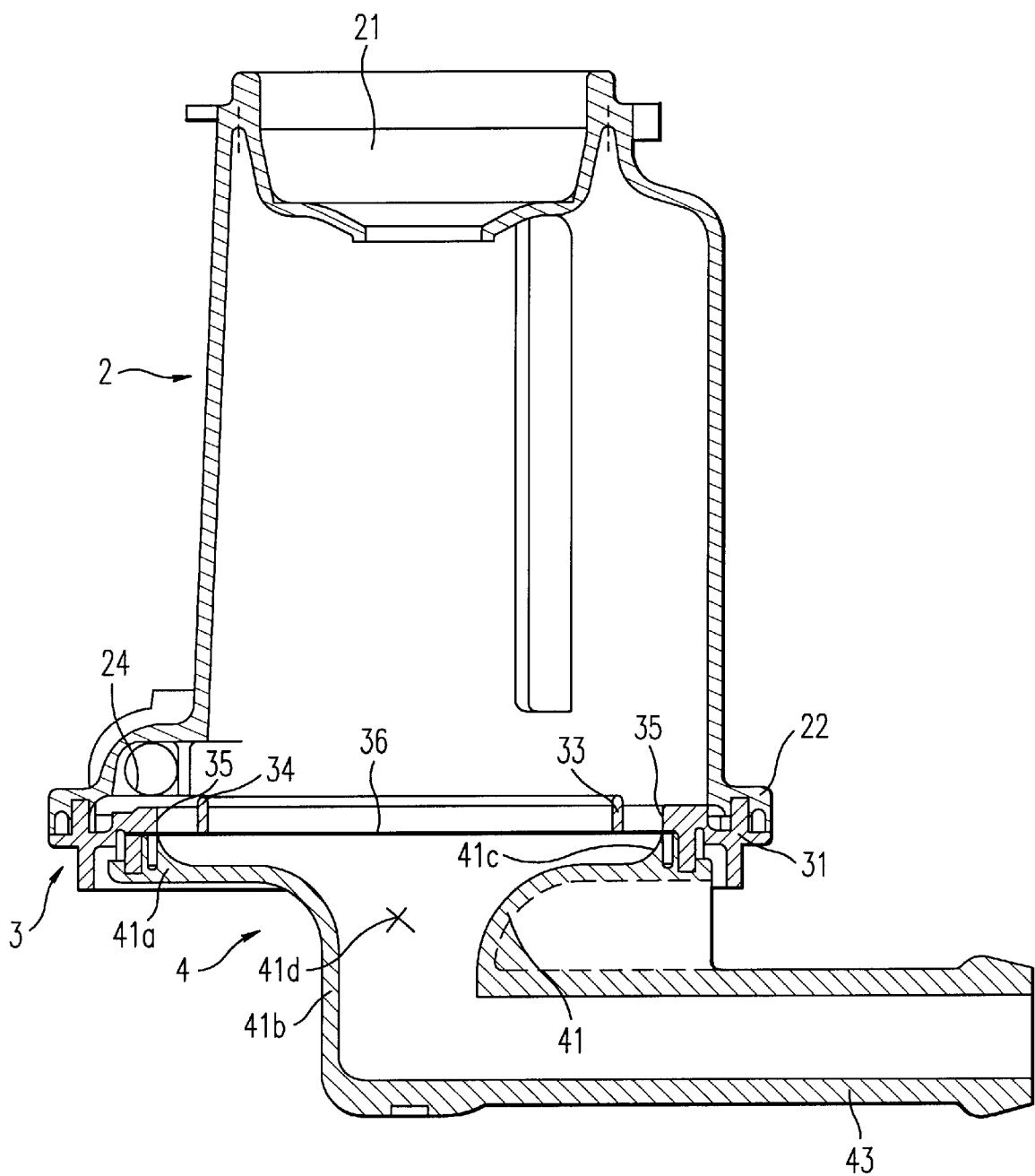
FIG. 2 is a longitudinal cross-sectional view of the resinous reservoir tank according to the first embodiment of the invention.

As shown in FIGS. 1 and 2, this reservoir tank 1 is mainly composed of an upper tank 2, an intermediate member 3 and a lower tank 4, which are made of resins respectively. The intermediate member 3 is interposed between the upper tank 2 and the lower tank 4. The upper tank 2, the intermediate member 3 and the lower tank 4 have weld portions 22a, 31a and 31b, and 42a respectively, which will later be described. By fusing and integrating the weld portions 22a, 31a and 31b and 42a using a known fusing method such as vibration welding and ultrasonic bonding, the upper tank 2, the intermediate member 3 and the lower tank 4 are connected to one another. The terms "upper" and "lower" in the present specification are used in consideration of the fact that the reservoir tank 1 stands vertically when actually used, as is the case with FIGS. 1 and 2.

Figure 3:
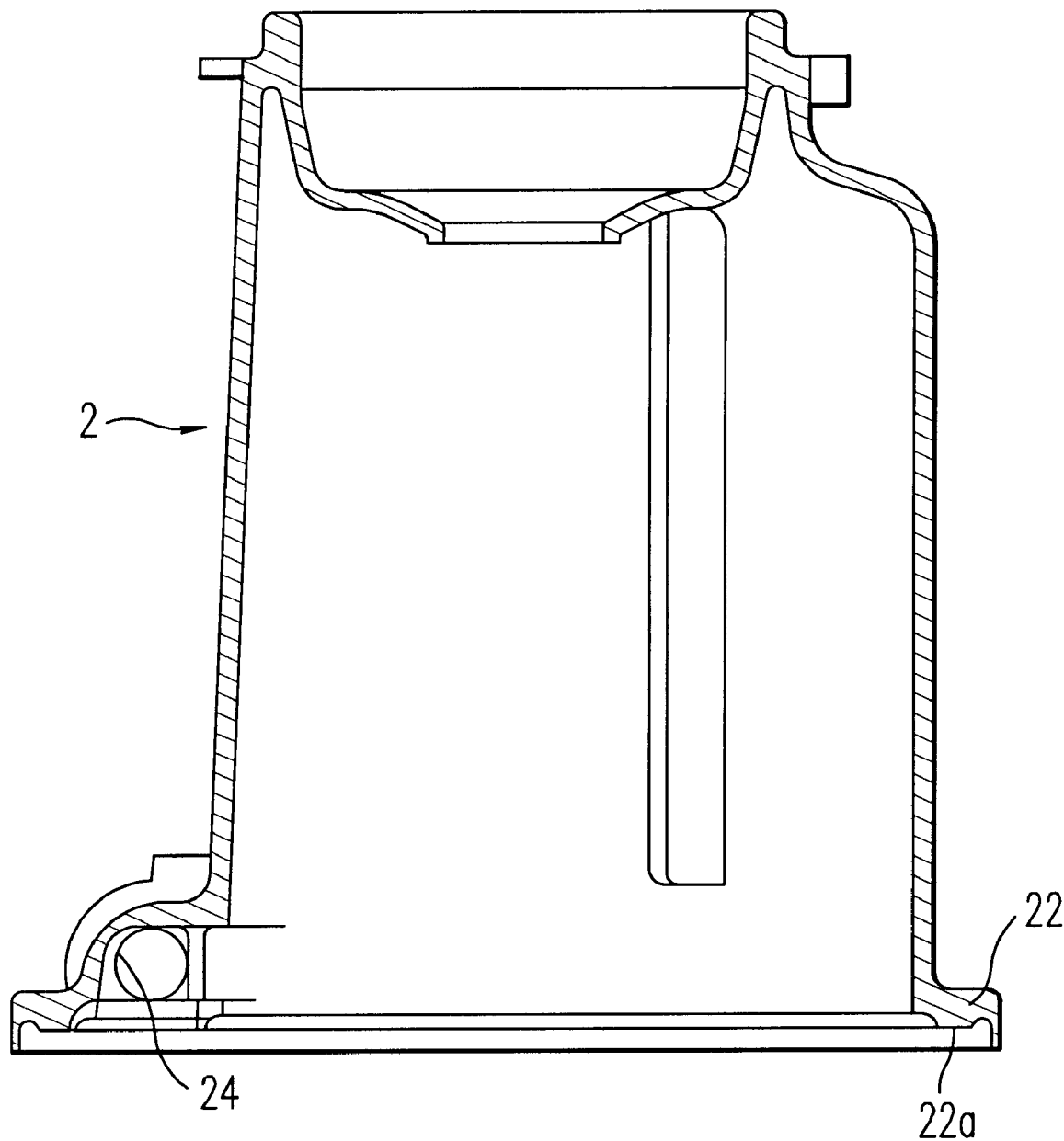
FIG. 3 is a longitudinal cross-sectional view of an upper tank of the resinous reservoir tank according to the first embodiment of the invention.

As shown in FIG. 3, the upper tank 2 is a generally cylindrical compact made of a synthetic resin. An oil filling port 21 is opened in the upper end of the upper tank 2. A flange portion 22 swelling like a collar is formed at the lower end of the upper tank 2. The lower face of the flange portion 22 has an annularly bulged weld portion 22a.

An inflow pipe 24, which extends in the tangent direction of an outer peripheral face 23 of the upper tank, is formed in the vicinity of the lower end of the upper tank 2 through composite manufacturing. The inflow pipe 24 may be provided as a resinous compact separate from the upper tank 2 and mounted to the upper tank 2 using a method such as welding.

Figure 4:
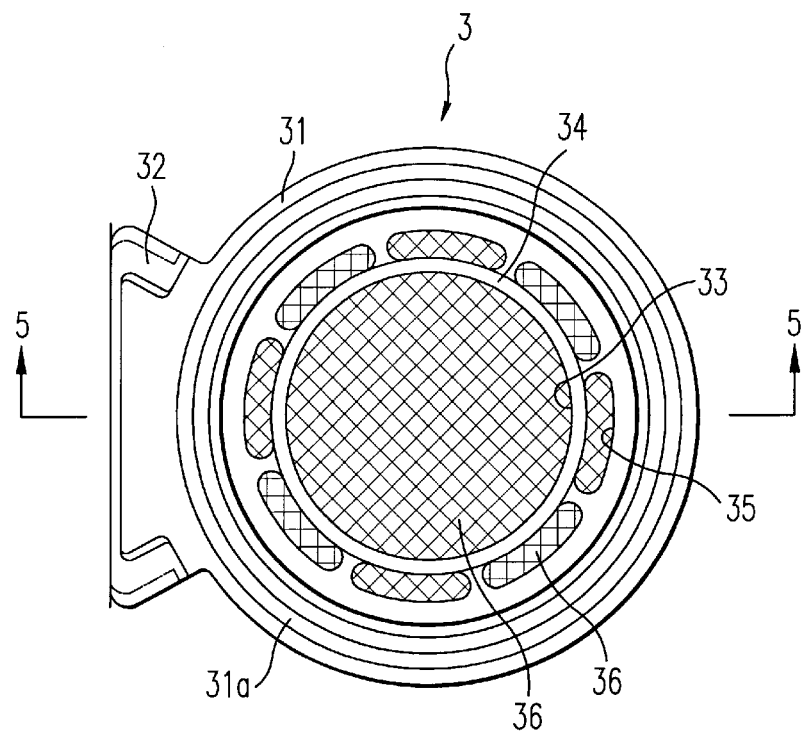
FIG. 4 is a plan view of an intermediate member of the resinous reservoir tank according to the first embodiment of the invention.
Figure 5:
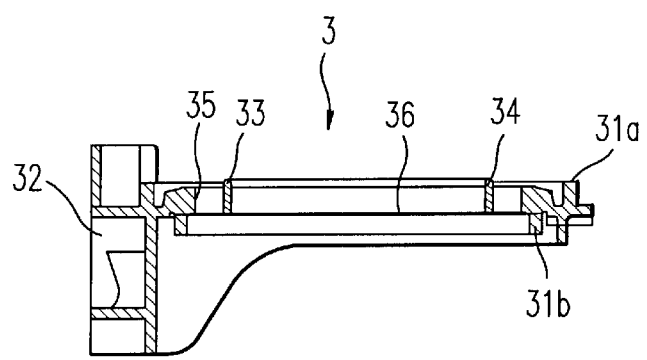
FIG. 5 is a cross-sectional view taken along a line b—b shown in FIG. 4.

As shown in FIGS. 4 and 5, the intermediate member 3 is a generally ring-shaped compact made of a synthetic resin. The intermediate member 3 has a ring member 31 and a bracket-mounting portion 32, which swells from part of the outer circumference of the ring member 31 and is integrated therewith. A known metal bracket (not shown) for installing the reservoir tank 1 at a predetermined location of a motor vehicle is mounted to the bracket-mounting portion 32.

A circular hole 33 is formed along the inner circumference of the ring portion 31 and covered with a nylon strainer 36 installed through insert molding. A plurality of oval holes 35 are formed around the circular hole 33 and arranged along the circumference thereof. The oval holes 35 are separated from the circular hole 33 by an annular partition wall 34 and also covered with the strainer 36 (As for the oval holes 35, refer to a second embodiment which will later be described). The strainer 36 serves to filter working fluid. It does not matter what kind of material is made into the strainer 36 or how the strainer 36 is mounted to the intermediate member 3.

Annularly bulged weld portions 31a, 31b, which are used at the time of welding, are provided along the circumference on the upper and lower faces of the ring portion 31 respectively.

Figure 6:
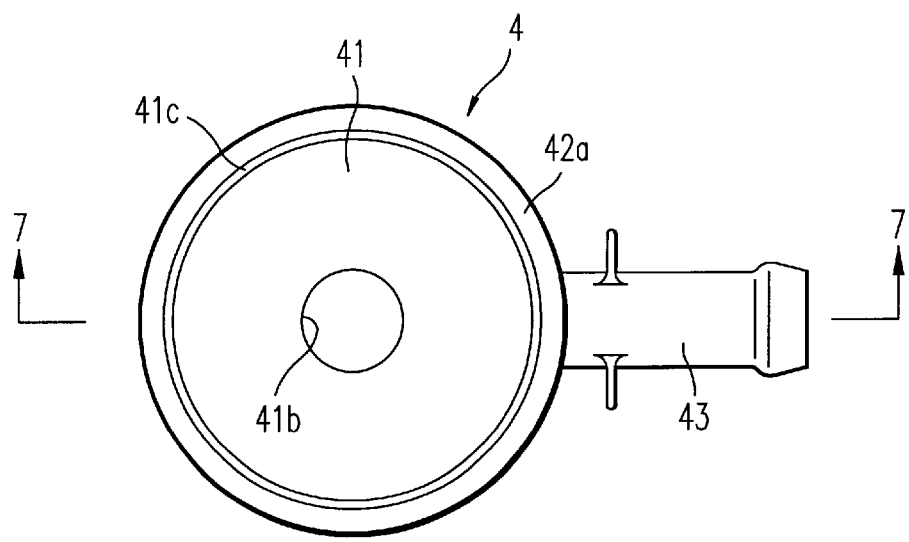
FIG. 6 is a plan view of a lower tank of the resinous reservoir tank according to the first embodiment of the invention.
Figure 7:
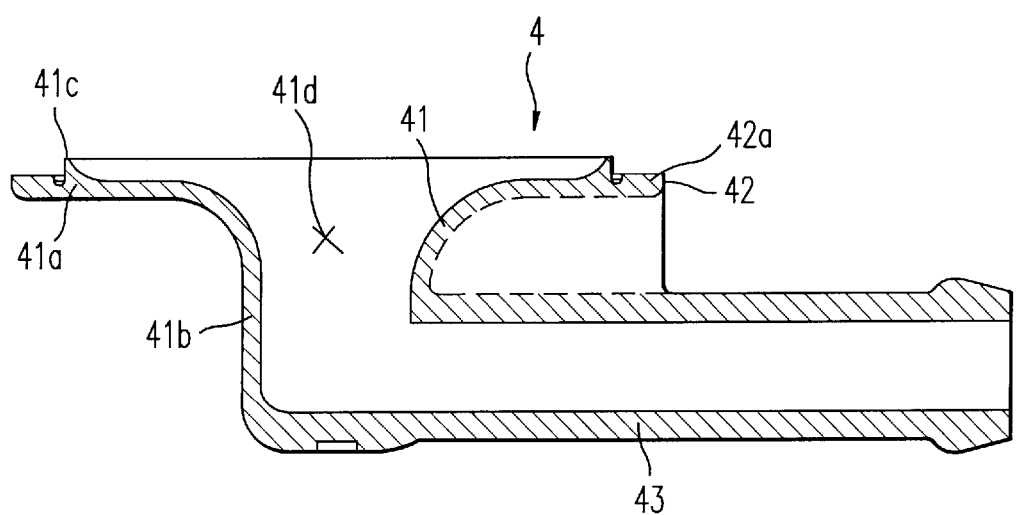
FIG. 7 is a cross-sectional view taken along a line b—b shown in FIG. 6.

Unlike the bottom-closed cylindrical lower tank of the reservoir tank according to the related art, as shown in FIGS. 6 and 7, the lower tank 4 is a generally funnel-shaped compact made of a synthetic resin. The lower tank 4 has a funnel portion 41 and an outflow pipe 43. The outflow pipe 43 is integrated with the funnel-shaped portion 41 so as to be connected to a smallest-diameter section 41b, which is the deepest point of the funnel-shaped portion 41.

More specifically, the funnel portion 41 is diametrally widened towards the intermediate member 3 until it becomes approximately equal in diameter to the circular area including the circular holes 33 and the oval holes 35 of the intermediate member 3. An annular peripheral wall 41c, which is approximately equal in diameter to the circular area, is formed in a largest-diameter section 41a of the funnel portion 41. The annular peripheral wall 41c abuts on the strainer 36 with the lower tank 4 and the intermediate member 3 connected to each other.

Because of this construction, a funnel chamber 41d defined by the strainer 36, the funnel portion 41 and the peripheral wall 41c is formed under the strainer 36. The funnel chamber 41d is open to the almost entire region of the strainer 36 and narrowed down with a steep incline. The outflow pipe 43 is connected to the smallest-diameter section 41b of the funnel portion 41.

A flange portion 42 is extended radially outwards from the largest-diameter section 41b of the funnel portion 41. As is the case with the upper tank 2 and the intermediate member 3, an annularly bulged weld portion 42a, which is used at the time of welding, is provided on the upper face of the flange portion 42.

The reservoir tank 1 thus constructed is installed in an engine room of the motor vehicle by means of a bracket attached to the intermediate member 3. The inflow pipe 24 is connected to the exhaust side of a power-assist mechanism portion as an actuator, and the outflow pipe 43 is connected to the intake side of an oil pump as a hydraulic pressure source. The oil filling port 2 of the upper tank 2 is closed by a known cap 21a while being slightly in communication with the atmosphere.

Effects of the reservoir tank according to the first embodiment of the invention will be described below.

(1) In the hydraulic power steering system, the pipe lines are arranged in consideration of the condition of a relevant motor vehicle, such as the positional relation among the reservoir tank 1 in the engine room, the power-assist mechanism portion and the oil pump, and interference with other peripheral components. Thereby the inflow pipe 24 and the outflow pipe 43 of the reservoir tank 1 are automatically oriented in their optimal directions.

In the reservoir tank 1 according to this embodiment, the upper tank 2 having the inflow pipe 24 and the lower tank 4 having the outflow pipe 43 are separated from the intermediate member 3, whose position is determined by the bracket. Therefore, when these three members 2, 3 and 4 are welded to one another, the pipes 24, 43 can be oriented in desired directions by appropriately setting their relative angles in the rotational direction.

Thus, only if the upper tank 2, the intermediate member 3 and the lower tank 4 of a certain type are prepared, the resinous reservoir tank 1 that is adaptable to the condition of a relevant motor vehicle and widely applicable can be provided at a low cost.

(2) The upper tank 2, the intermediate member 3 and the lower tank 4 are welded to one another by means of a method such as vibration welding and ultrasonic bonding. Therefore, only if the angles of jigs for mounting the components 2, 3 and 4 to a welding device are changed, the angles of the upper tank 2 and the lower tank 4 relative to the intermediate member 3 can be set arbitrarily.

(3) Because the strainer 36 for filtering working fluid is installed in the ring portion of the intermediate member 3, it becomes possible to employ a method of securing the strainer 36 to the intermediate member 3 by means of insert molding. Thus, the strainer 36 can be installed in the reservoir tank 1 without employing a separate component such as a strainer holder or resorting to an additional process of mounting the strainer.

(4) If working fluid is at a low temperature and demonstrates high viscosity, for example, when the vehicle is started during the winter season, it is difficult for the working fluid to penetrate the strainer 36. However, according to this embodiment, due to the operation of the funnel chamber 41d of the lower tank 4, even working fluid of high viscosity can penetrate the strainer 36 easily.

That is, the lower tank 4 having the outflow pipe 43 is in the shape of a funnel, unlike the bottom-closed cylindrical lower tank of the reservoir tank according to the related art. The lower tank 4 has the funnel chamber 41d, which stretches substantially over the entire region of the strainer 36 and opens under the strainer 36.

Then the negative pressure resulting from a suction force of the oil pump connected to the outflow pipe 43 is introduced into the funnel chamber 41d. This negative pressure functions under the strainer 36 and substantially over the entire region of the strainer 36. Therefore, even working fluid of high viscosity can penetrate the strainer 36 easily.

Next, a resinous reservoir tank according to a second embodiment of the invention will be described.

Figure 8:
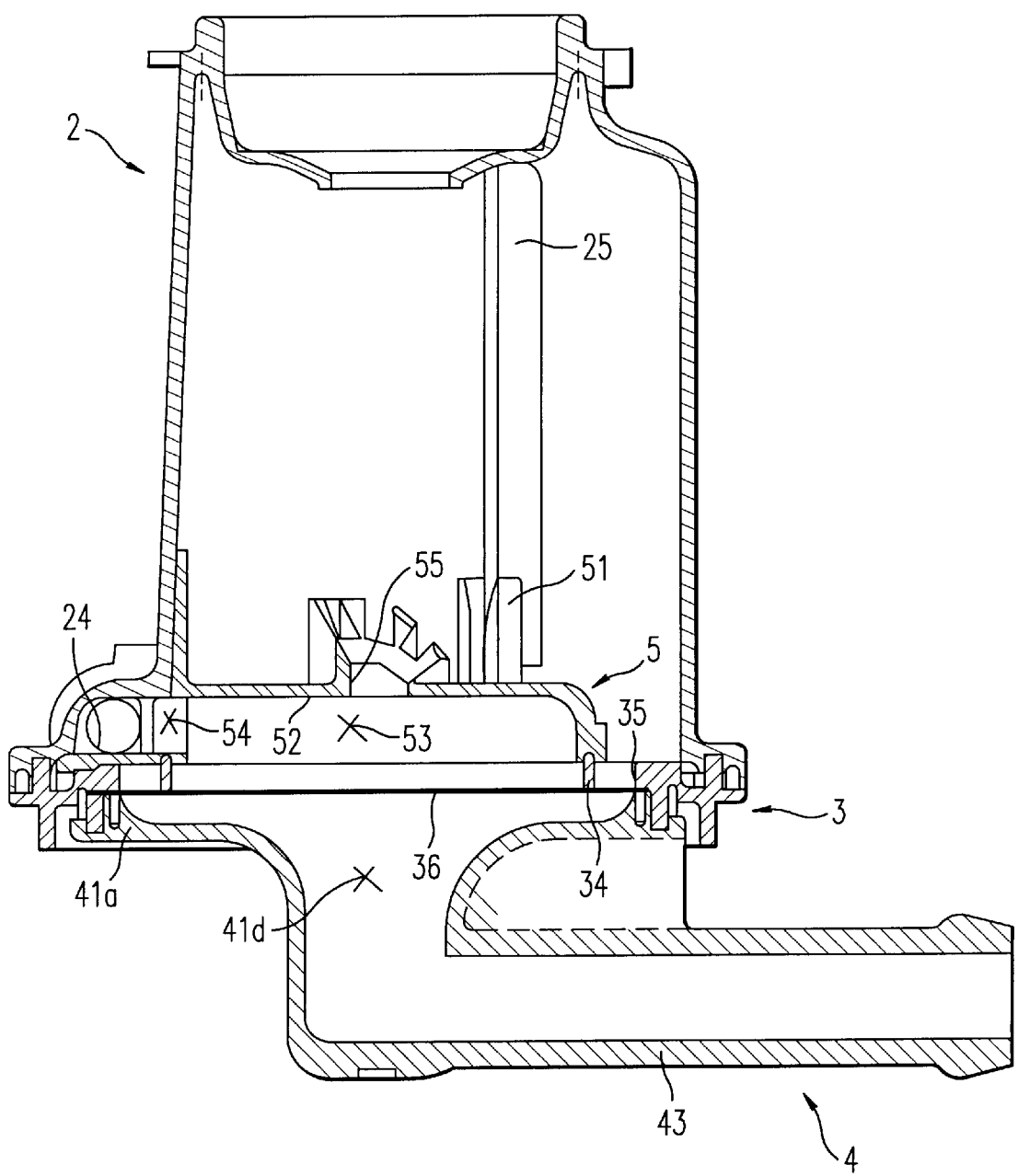
FIG. 8 is a longitudinal cross-sectional view of a resinous reservoir tank according to a second embodiment of the invention.

The reservoir tank 1 shown in FIG. 8 is constructed by adding a baffler 5 to that of the first embodiment and generally referred to as a pressurizing reservoir tank. The reservoir tank 1 of the first embodiment is referred to as a non-pressurizing reservoir tank.

The baffler 5 is described in detail in Japanese Patent Application No. HEI 11-89938, which has previously been submitted by the present applicant. The baffler 5 serves to pressurize the working fluid that has flown in from the inflow pipe 24 and make it easy for the working fluid to penetrate the strainer 36.

The baffler 5 has a plurality of engaging salient portions 51 in the shape of crab claws. The engaging salient portions 51 are engaged with and fitted to fins 25 formed on the inner wall of the upper tank 2, whereby the baffler 5 is securely interposed between the upper tank 2 and the intermediate member 3.

The baffler 5 has a recess portion 52 which is approximately equal in diameter to the circular hole 33 of the intermediate member 3. If the baffler 5 is mounted to the upper tank 2, the recess portion 52 thereby cooperates with the strainer 36 and the partition wall 34 of the intermediate member 3 to define a pressure chamber 53.

The pressure chamber 53 is connected to the inflow pipe 24 by a through-hole 54 formed in the baffler 5. Almost all the working fluid that has flown in from the inflow pipe 24 flows into the pressure chamber 53.

An air vent hole 55 for venting air from working fluid is formed in the top of the recess portion 52. The air vent hole 55 is normally closed through insertion of a bar-shaped oil level gauge (not shown) attached to the cap.

Because the baffler 5 is thus disposed, the pressure chamber 53 and the funnel chamber 41d face each other at a short distance with the strainer 36 of the intermediate member 3 interposed therebetween. The operation of the second embodiment is as follows.

First of all, the working fluid that has flown in from the inflow pipe 24 is thrust into the pressure chamber 53 and thereby decelerated. Therefore, flow velocity energy is converted into pressure energy, so that the working fluid is pressurized.

That is, the pressure chamber 53 assumes a positive pressure. On the contrary, since the funnel chamber 41d of the lower tank 4 is connected to the intake side of the oil pump through the outflow pipe 43, the suction force of the oil pump is applied to the funnel chamber 41d. As a result, the funnel chamber 41d assumes a negative pressure.

Thus, the working fluid in the reservoir tank 1 is at the positive pressure on one side of the strainer 36 (the side of the pressure chamber 53) and is at the negative pressure on the other side of the strainer 36 (the side of the funnel chamber 41d). The positive-pressure side and the negative-pressure side face each other at a short distance. Because of such a differential pressure, even working fluid of high viscosity can penetrate the strainer 36 easily.

The effects resulting from the generally funnel-shaped lower tank 4, which have been described in connection with the first embodiment, are more strikingly achieved by adding the baffler 5.

The funnel chamber 41d and the upper tank 2 (in the region other than the pressure chamber 53) communicate with each other through the oval holes 35 formed in the intermediate member 3. The oval holes 35 serve as a passage for discharging the air contained in the working fluid, which has flown out from the pressure chamber 53, penetrated the strainer 36 and reached the fuel chamber 41d, into the upper tank 2 that is in communication with the atmosphere.

The invention is not limited to the first or second embodiment and may be modified as follows.

(a) In the aforementioned embodiments, the intermediate member 3 has the circular hole 33 and the oval holes 35 separated from the circular hole 33 by the partition wall 34. However, the invention is not necessarily limited to this construction.

Such a construction has been employed to use the intermediate member 3 as a common component in both the non-pressurizing reservoir tank according to the first embodiment and the pressurizing reservoir tank according to the second embodiment. The oval holes 35, which are separated from the circular hole 33, perform their functions only in the pressurizing reservoir tank. If the intermediate member 3 is not intended for common use, the following construction can be employed.

That is, in the non-pressurizing reservoir tank, the circular hole 33 of the intermediate member 3 is diametrally widened to the extent of covering the region including the oval holes 35. As a result, the circular hole 33 becomes approximately equal in diameter to the largest-diameter section 41*a* of the funnel portion 41 of the lower talk 4. In this case, the circular hole thus diametrally widened corresponds to "the inner circumference of the ring portion".

(b) As described in connection with the second embodiment, the oval holes 35 formed in the intermediate member 3 are intended for air vent. Therefore, the holes to be formed in the intermediate member 3 should not necessarily be oval. As long as they perform the function of air vent, their shape, dimension and number are not an issue.

Finally, other technical concepts that can be grasped from the aforementioned embodiments and other examples will be described together with their effects.

(i) The resinous reservoir tank may have a construction wherein the strainer 36 is secured to the ring portion 31 of the intermediate member 3. By employing this construction, a unique effect can be achieved.

(ii) The resinous reservoir tank may have a construction wherein the lower tank 4 is composed of the generally funnel-shaped funnel portion 41, the flange portion 42 extended radially outwards from the largest-diameter section 41*a* of the funnel portion 41, and the outflow pipe 43, and wherein the flange portion 42 has the weld portion 42*a* to which the intermediate member 3 is welded.

By employing this construction, the lower tank 4 can be welded to the intermediate member 3 over a great length. Therefore it becomes possible to guarantee sufficient bonding strength and sealability between both the components 3 and 4.

(iii) The resinous reservoir tank may have a construction wherein the upper tank 2 has the pressure chamber 53 for pressurizing the working fluid that has flown in from the inflow pipe 24. The pressure chamber 53 is formed by the baffler 53 fitted in the upper tank 2. More specifically, the baffler 5 has the recess portion 52 that is approximately equal in diameter to the inner circumference (the circular hole 33) of the ring portion 31 of the intermediate member 3. The recess portion 52 and the strainer 36 are designed to define the pressure chamber 53, and the strainer 36 is located between the funnel chamber 41*d* and the pressure chamber 53.

By employing this construction, the fluid that has flown in from the inflow pipe 24 is pressurized in the pressure chamber 53, which assumes a positive pressure. On the other hand, as described above, the funnel chamber 41*d* of the lower tank 4 assumes a negative pressure. Because of this differential pressure, even fluid of high viscosity can penetrate the strainer 36 easily. Thereby a unique effect is achieved.

What is claimed is:

1. A resinous reservoir tank comprising:
    a resinous upper tank having an inflow pipe; and
    a resinous lower tank having an outflow pipe, wherein:
    a generally ring-shaped resinous intermediate member having a bracket-mounting portion is interposed between the upper tank and the lower tank;
    the upper tank and the intermediate member are connected to and integrated with each other; and
    the intermediate member and the lower tank are connected to and integrated with each other.

2. The resinous reservoir tank according to claim 1, wherein:
    the upper tank and the intermediate member are connected to each other by means of welding; and
    the intermediate member and the lower tank are connected to each other by means of welding.

3. The resinous reservoir tank according to claim 1 or 2, wherein:
    the intermediate member is composed of a generally ring-shaped ring portion and a bracket-mounting portion disposed in part of the ring portion; and
    a strainer is disposed along the inner circumference of the ring portion.

4. The resinous reservoir tank according to claim 3, wherein:
    the lower tank is generally formed into the shape of a funnel and a largest-diameter section of the generally funnel-shaped lower tank is made approximately equal in diameter to the strainer, so that the lower tank and the strainer define a funnel chamber; and
    the outflow pipe is connected to a smallest-diameter section of the generally funnel-shaped lower tank by means of integral molding.

* * * * *